United States Patent
Blanchard

[15] 3,666,102
[45] May 30, 1972

[54] AUTOMATICALLY OPERATED OIL SEPARATOR SCUM TROUGH

[72] Inventor: Walter P. Blanchard, P.O. Box 64, Quincy, Mass. 02169

[22] Filed: Sept. 15, 1970

[21] Appl. No.: 72,438

[52] U.S. Cl............................................210/138, 210/525
[51] Int. Cl..............................................B01d 21/24
[58] Field of Search..........................................210/138, 525

[56] References Cited

UNITED STATES PATENTS

| | | |
|---|---|---|
| 2,455,338 | 11/1948 | Lind....................210/525 X |
| 2,633,989 | 4/1953 | Kelly et al....................210/525 X |
| 2,780,361 | 2/1957 | Evans et al....................210/525 X |
| 3,044,627 | 7/1962 | Lind....................210/525 X |

Primary Examiner—J. L. De Cesare
Attorney—Morse, Altman & Oates

[57] ABSTRACT

A timing control system is provided for automatically separating oil floating on the surface of water or the like and is useful in drainage systems for oil handling facilities and similar installations. A settling tank receives drains typically comprised of oil and water. A weir arrangement maintains the level of the drains at a predetermined height in the tank and a longitudinally slit scum pipe is disposed partly submerged across the surface of the liquids. A timing device automatically rotates the pipe so that the slit will allow the oil floating on the surface to drain from the tank, the water being separately removed through the weir.

7 Claims, 3 Drawing Figures

PATENTED MAY 30 1972 3,666,102

INVENTOR.
WALTER P. BLANCHARD
BY Morse, Altman + Oates
ATTORNEYS

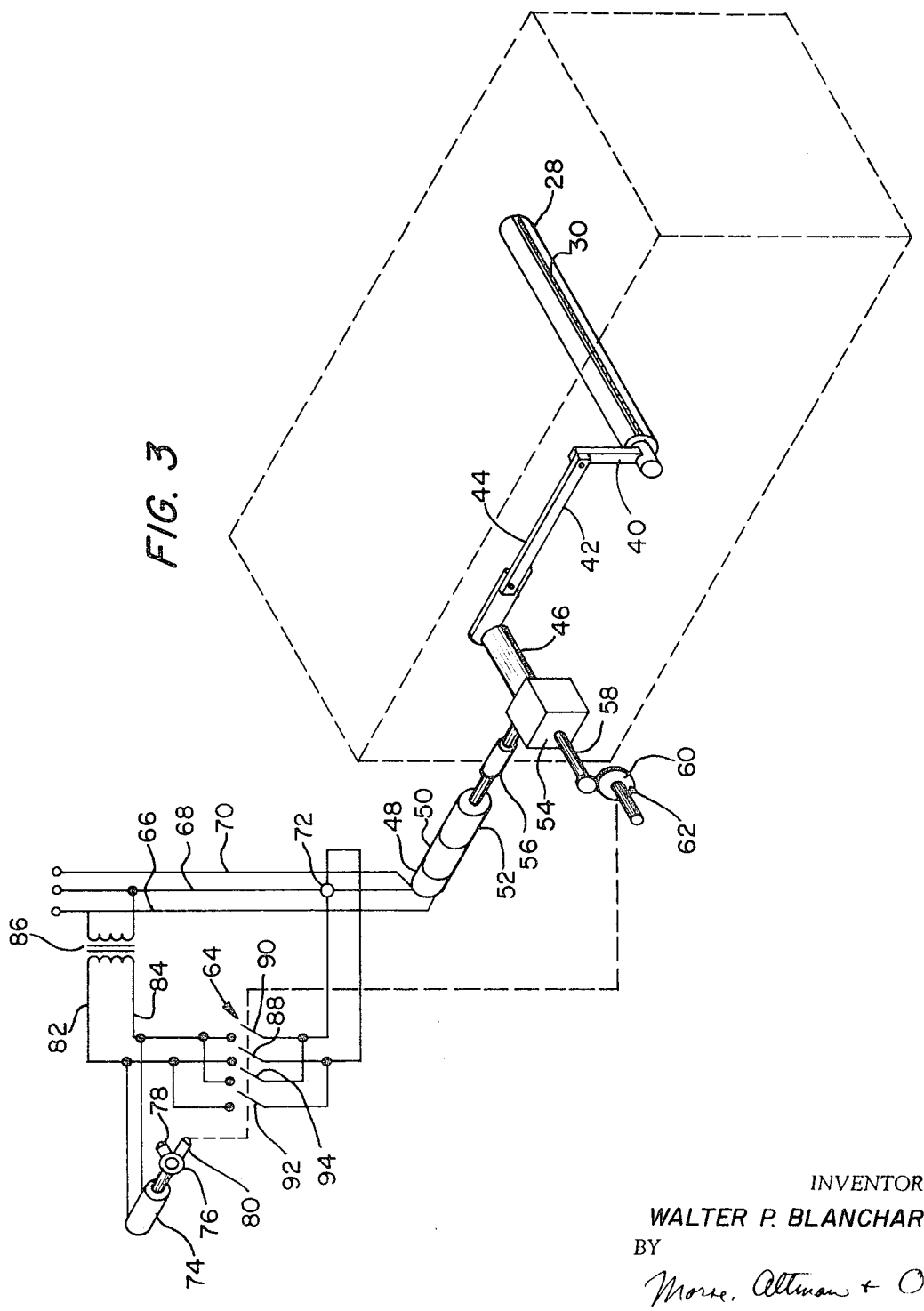

AUTOMATICALLY OPERATED OIL SEPARATOR SCUM TROUGH

BACKGROUND OF THE INVENTION

1. Field of the Invention

This invention relates generally to control systems and more particularly is directed towards an automatically operated timer control system for separating collected drains of different liquids such as oil and water.

2. Summary of the Prior Art

In many oil-handling facilities drainage systems are provided for collecting runoffs including rain water along with spilled oil. Many systems include means for separating the oil from the water before discharging the drains into a sewer system. The recovered oil may then be collected for cleaning and subsequent re-use or other disposition. One technique currently used for separating oil and water is to pass all of the drains, both water and oil mixed, to a scum or settling tank in which oil is allowed to float to the surface where it is skimmed off manually into one tank while a baffle arrangement permits the water to run off through a separate drain into another tank.

Such systems require an attendant to inspect the settling tank periodically and manually operate the scum skimming mechanism to remove the accumulated floating oil.

It is an object of the present invention to provide a system for automatically actuating the skimming mechanism to drain off the floating oil. It is a further object of this invention to provide a durable and reliable automatically operated system for separating oil and water in a drainage system.

SUMMARY OF THE INVENTION

This invention features an automatic timer system for separating oil and water or other immiscible liquids, comprising a settling tank into which the mixed liquids are delivered with the light liquids floating to the surface, means for maintaining the level of the liquids at a predetermined height, a first discharge line for draining the heavier liquids from the tank to another collection tank and a rotatable, longitudinally slit pipe disposed at the surface of the liquid and upon rotation thereof, adapted to drain off the floating oil or other lighter liquid into a collection tank separate from the other tanks. An automatic timing system operating through a timing motor, switching arrangements, drive motor and linkage mechanism cyclically operates the pipe for a predetermined period.

DETAILED DESCRIPTION OF THE PREFERRED EMBODIMENT

Figure 1:
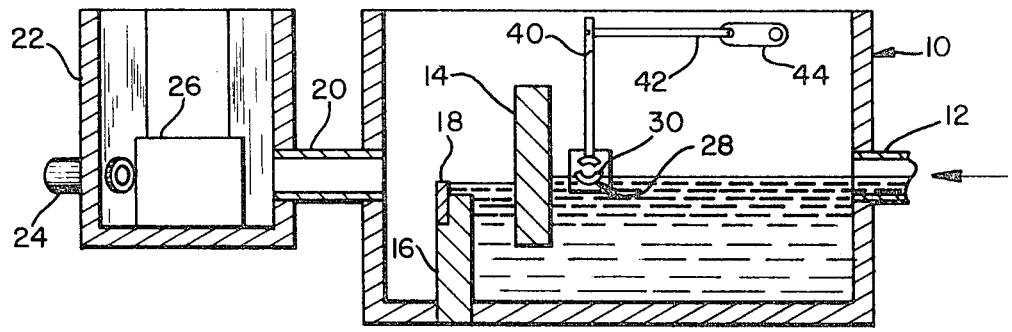
FIG. 1 is a sectional view in side elevation of a drainage tank separation system made according to the invention.

Referring now to the drawings, the apparatus is generally organized about an oil separating tank 10 which, in an area drainage system, typically is set into the ground and normally for this purpose is constructed of concrete or the like. The tank 10 is connected by a conduit 12 to various drain lines which may include trenches or the like adapted to collect rain water runoff along with other liquids such as oil, gasoline or other spillage. In any event, the drains are delivered into the tank 10 through the conduit 12 where they collect with the heavier liquids typically the water, settling to the bottom of the tank while the lighter liquids, typically oil, rising to the surface.

Figure 2:
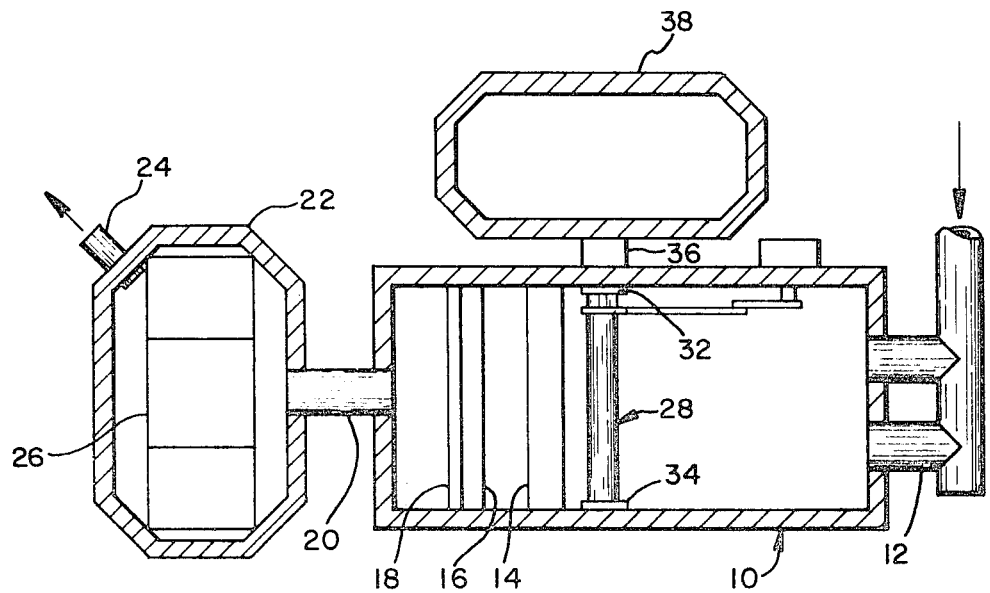
FIG. 2 is a sectional top plan view thereof, and, FIG. 3 is a schematic diagram of the pipe operating mechanism.

Mounted within the tank 10 towards the left-hand side thereof as viewed in FIGS. 1 and 2, is a raised wall 14 mounted vertically and spaced from the bottom wall of the tank 10 by a distance of 1 foot, for example, the lower edge of the wall 14 being substantially below the normal level of the liquid collected in the tank. The wall 14 extends well above the normal surface and serves as a barrier preventing any oil floating on the surface from escaping into the water drain portion of the tank to be described below.

Spaced from the wall 14 is a barrier wall 16 extending vertically upward from the bottom wall of the tank 10 to a height above the lower edge of the raised wall 14 and below the normal surface of the collected liquid in the tank. Mounted vertically to the upper portion of the wall 16 is a weir plate 18 extending across the top of the wall and serving as the water level overflow limit for the tank. It will be understood as the drains collect in the main portion of the tank, a portion of water will collect between the walls 14 and 16 with the oil remaining to the right-hand side of the raised wall 14. As more drains enter the tank, the clean water between the walls 14 and 16 will overflow the weir plate so as to maintain a constant level within the main portion of the tank. The overflow from the weir plate will collect between the wall 16 and the left-hand end wall of the tank before it reaches the level of a discharge conduit 20 extending between the tank 10 and a water collection tank 22.

The tank 22 generally is somewhat smaller than the main tank 10 and typically is fabricated from concrete. The tank 22 is connected by a conduit 24 to a sewage system and the discharge through the conduit 24 will be substantially clear from oil so as not to foul the conventional sewage system. In practice, the conduit 24 will be on the same level as the conduit 20 and a plurality of bales 26, typically three, are located in end-to-end relation along the bottom of the tank 22 extending to a level slightly higher than the conduits 20 and 22.

The oil drainage portion of the system includes a scum trough 28 in the form of a cylindrical pipe having one or more longitudinal slots 30 formed therealong. The trough 28 is mounted in the tank 10 on the inlet side of the wall 14 and extends horizontally across the tank approximately at the normal level of the liquid. Preferably, the trough 28 is located in close proximity to the wall 14 where the surface of the liquid will be relatively undisturbed by the influx of drains from the conduit 12.

The trough 28 is rotatably supported at its ends by bearings 32 and 34 mounted on side walls for the tank 10. The trough 28 is coupled by means of a conduit 36 to an oil collection tank 38 disposed beside the main tank 10 and typically fabricated from concrete. The tank 38 serves as a storage for the oil or other liquid that is drawn off from the separator tank 10 and whatever accumulates therein is pumped out from time to time for cleaning, re-use or disposal, as desired.

The trough 28 draws off the oil floating on top of the water by periodic rotation about its horizontal axis so as to bring at least one of its slot openings 30 below the surface of the liquid whereby the oil floating as a film on top of the water will run into the trough 28 and drain off into the tank 38. This action of the trough is controlled by means of an automatic timing and actuating system to be described more fully below.

The trough 28 is provided with a perpendicularly extending lever 40 which is connected by means of a link 42 to a crank 44. The crank 44, best shown in FIG. 3, is drivingly connected to a rotatable shaft 46 which is periodically rotated through the timing drive system illustrated in FIG. 3.

The timing drive system includes a drive motor 48 coupled through a magnetic disc brake 50 to a speed reducer 52. Typically, the motor 48 is a 1-horse power motor which in the present embodiment operates at 1,725 rpm. The speed reducer 52 changes this output to 30 rpms and drives another speed reducer 54 through a coupling 56. The speed reducer 54 typically being on a 30 to 1 ratio has an output of 1 rotation per minute for the shaft 46 and its crank 44. The speed reducer 54 also has a secondary output in the form of 1 rpm shaft 58 driving a gear 60 provided with a contact actuating element 62 operatively connected to a bank of switches 64.

The motor 48 is connected to a power source through leads 66, 68 and 70 with lead 68 being provided with a magnetic switch 72. The switch 72 is controlled by means of a timing arrangement comprised of a time switch motor 74 drivingly connected to a 24 hour dial 76 having contact actuators 78 and 80. The motor 74 is energized by leads 82 and 84 connected through a transformer 86 to the power leads for the motor 48. Leads 82 and 84 are provided with switches 88 and 90 as well as with parallel by-pass switches 92 and 94. These switches are under the partial control of the dial 76 and its actuators 78 and 80. The motor runs continuously and as the connected dial rotates, its actuator 80 closes the bank of switches 64 which in turn will close the switch 72 causing the motor 48 to be energized thereby rotating the trough 28 in an oscillating motion. The contact 78, in the preferred embodiment, is set 5 minutes behind the contact 80 and at the end of the 5-minute interval the actuator 78 will open the switches 92 and 94 leaving the switches 88 and 90 closed. This will cause the motor 48 to continue to run, typically for a 6-minute interval controlled by means of the gear 60 and its actuator 62. As the gear 60 makes a full revolution, its actuator will open the switches 88 and 90 to de-energize the motor 48 to stop the motion of the trough. The cycle will repeat itself at every 24-hour interval or as many times as required since the cycle interval may be readily varied merely by changing the speed of the motor 74 or adding additional contacts to the dial 76. Also, the period of operation may be increased or decreased by changing the angular spacing of the actuators as well as by modifying the gear 60 and its actuator 62.

Having thus described the invention what I claim and desire to obtain by Letters Patent of the United States is:

1. Apparatus for separating liquids of different densities, comprising
   a. storage means for receiving said liquids in common,
   b. level control means for maintaining said liquids at a predetermined level in said storage means,
   c. first drain means connected to said storage means below said level for separately draining the heavier of said liquids,
   d. second drain means connected to said storage means substantially at said level,
   e. said second drain means being movable into and out of the lighter of said liquids floating at said level for draining said lighter liquid from said storage means separately from said heavier liquid, and
   f. timed actuating means drivingly connected to said second drain means for cyclically moving said second drain means into and out of said lighter liquid at predetermined intervals.

2. Apparatus according to claim 1 wherein said first drain means and said level control means include a first vertical wall having an opening therein below said level and a second vertical wall spaced therefrom and having its upper edge above said opening and below said level.

3. Apparatus according to claim 1 wherein said second drain means includes a conduit extending across the surface of said liquids and formed with at least one opening therein in a position normally above said level, said conduit being mounted for angular movement about its longitudinal axis whereby said conduit opening may be moved from a position above said level to a position below said level.

4. Apparatus according to claim 1 wherein said timed actuating means includes a first motor drivingly connected to said second drain means, power leads connected to said first motor, a first switch in said power leads, parallel leads connected to said first switch, second switches in said parallel leads, first switch actuating means adapted to open all and close some of said second switches, a second motor drivingly connected to said actuating means and second switch actuating means drivingly connected to said first motor and adapted to close others of said second switches.

5. Apparatus according to claim 4 including a lever connected to said second drain means, a crank connected to said first motor, and a link connected to said crank and to said level.

6. Apparatus according to claim 1 including second storage means connected separately to said first and second drain means for separately storing the separated liquids.

7. Apparatus according to claim 3 wherein said second drain means is a longitudinally slit pipe.

* * * * *